(12) United States Patent
Chonan

(10) Patent No.: US 6,513,822 B1
(45) Date of Patent: Feb. 4, 2003

(54) WHEEL SUSPENSION TYPE FRONT FORK

(75) Inventor: Yoshiya Chonan, Chiba-ken (JP)

(73) Assignee: Sakae Engineering Inc., Chiba-Ken (JP)

( * ) Notice: Subject to any disclaimer, the term of this patent is extended or adjusted under 35 U.S.C. 154(b) by 0 days.

(21) Appl. No.: 09/698,279

(22) Filed: Oct. 30, 2000

(30) Foreign Application Priority Data

Mar. 30, 2000 (JP) ........................................ 2000-093828

(51) Int. Cl.$^7$ ............................................. B62K 25/08
(52) U.S. Cl. ..................... 280/276; 280/275; 280/279; 267/34; 267/226
(58) Field of Search ............................... 280/276, 275, 280/279, 280; 267/226, 34

(56) References Cited

U.S. PATENT DOCUMENTS

| 4,328,960 A | * | 5/1982 | Handke et al. | 267/8 R |
| 5,088,705 A | * | 2/1992 | Tsai | 267/226 |
| 5,284,352 A | * | 2/1994 | Chen | 280/276 |
| 5,456,480 A | * | 10/1995 | Turner et al. | 280/276 |
| 5,509,675 A | * | 4/1996 | Barnett | 280/276 |
| 5,509,677 A | * | 4/1996 | Bradbury | 280/276 |
| 5,580,075 A | * | 12/1996 | Turner et al. | 280/276 |
| 5,597,169 A | * | 1/1997 | Bradbury | 280/276 |
| 5,829,773 A | * | 11/1998 | Rajace | 280/276 |
| 5,848,675 A | * | 12/1998 | Gonzalez | 188/319.2 |
| 6,095,541 A | * | 8/2000 | Turner et al. | 280/276 |
| 6,105,987 A | * | 8/2000 | Turner | 280/276 |
| 6,105,988 A | * | 8/2000 | Turner et al. | 280/276 |
| 6,120,049 A | * | 9/2000 | Gonzalez et al. | 280/276 |
| 6,145,862 A | * | 11/2000 | D'Aluisio et al. | 280/276 |

FOREIGN PATENT DOCUMENTS

| CA | 450290 A | * | 8/1948 | 267/34 |
| DE | 937624 A | * | 12/1955 | 267/34 |
| JP | 63-199894 | | 12/1988 | |

\* cited by examiner

*Primary Examiner*—Daniel G. DePumpo
*Assistant Examiner*—Daniel Yeagley
(74) *Attorney, Agent, or Firm*—McDermott, Will & Emery

(57) ABSTRACT

A hydraulic suspension unit which is arranged in a supporting pipe has a piston arranged in a cylinder and a piston rod which is coupled with the piston and projected from the cylinder and detachably coupled with a slide pipe edge portion. Coil springs for buffering are further built in the cylinder. Thus, the hydraulic suspension unit can be easily exchanged.

13 Claims, 5 Drawing Sheets

WHEEL SUSPENSION TYPE FRONT FORK

BACKGROUND OF THE INVENTION

1. Field of the Invention

The invention relates to a wheel suspension type front fork of a bicycle or another two-wheeler.

2. Description of the Related Background Art

As such a kind of wheel suspension type front fork, a structure such that a supporting pipe and a slide pipe which is slidable along the supporting pipe are provided and an exchangeable hydraulic suspension unit is arranged in the supporting pipe has been known (for example, U.S. Pat. No. 5,580,075).

The conventional hydraulic suspension unit is constructed by: a cylinder filled with oil; a piston in the cylinder, and a pair of piston rods which are respectively coupled with opposite surfaces of the piston and projected from both ends of the cylinder. One piston rod is fixed to a lower edge of the slide pipe and the other piston rod is come into contact through a flange with buffer means as a separate member such as coil spring, rubber elastic member, or the like arranged over the supporting pipe.

However, if a pair of piston rods are provided as a hydraulic suspension unit, since it is necessary to provide oil sealing portions for both ends of the cylinder, the unit becomes expensive by an amount corresponding to the oil sealing portions. When a shock force is applied to the lower piston rod through the slide pipe, the upper piston rod and piston are also elevated upward in the cylinder, so that a volume of the cylinder does not change. Therefore, an air spring using the air cannot be provided in the cylinder.

However, in the supporting pipe, when the buffer means is arranged over the hydraulic suspension unit, since it is difficult to insert the unit from the upper edge of the supporting pipe and position it, hitherto, the unit is positioned and fixed from the lower edge side of the supporting pipe before the slide pipe is assembled.

However, in case of the structure such that the unit is positioned on the lower edge side of the supporting pipe, when the hydraulic suspension unit is exchanged, it is necessary to remove the slide pipe from the supporting pipe. For this purpose, the operation to remove a front wheel, a braking mechanism, and a cable for braking from the slide pipe is necessary and a large troublesomeness and a long time are required for the exchanging operation. Since a lubricant such as a grease or the like is coated onto slide opposite surfaces of the supporting pipe and slide pipe and a dust sealing material for prevention of penetration of water or dust is attached, if the slide pipe is removed, there is a fear such that the dust or the like deposited onto both pipes is deposited onto the slide opposite surfaces and becomes a cause of a defective operation.

As another hydraulic suspension unit, a unit disclosed in Japanese Utility Model Application Laid-open No. 63-199894 is known. According to the structure of such a unit, a coil spring for buffering different from the unit is arranged between a supporting pipe and a slide pipe, and a piston rod of the unit is coupled and fixed in the slide pipe. When the unit is exchanged, therefore, it is necessary to similarly remove the slide pipe from the supporting pipe.

SUMMARY OF THE INVENTION

It is an object of the invention to provide an inexpensive wheel suspension type front fork which holds an air spring function and can efficiently perform an exchanging operation.

According to a preferred aspect of the invention, there is provided a wheel suspension type front fork having a supporting pipe which is attached to a steering pipe and a slide pipe which is slidably fitted to the supporting pipe and has a bearing pedestal in an edge portion, comprising a cap for detachably closing an opening of an edge portion of the supporting pipe and an exchangeable hydraulic suspension unit which is arranged in the supporting pipe, wherein the hydraulic suspension unit comprises: a cylinder which is exchangeably arranged in the supporting pipe through the opening and in which oil is filled; a piston which is moved in the cylinder and has an oil passage; a piston rod which is attached to the piston and projected from the cylinder and detachably coupled with the edge portion of the slide pipe; and buffer means, arranged in the cylinder, for buffering a shock force which is transferred through the piston.

Since the buffer means such as a coil spring or the like is assembled in the cylinder, it is sufficient to provide one piston rod. In case of providing one piston rod, since a volume of the cylinder is changed by the upward motion of the piston rod, even if an air spring is provided in the cylinder, it normally functions. Further, since only the hydraulic suspension unit in which the buffer means is assembled is enclosed in the supporting pipe, the unit can be inserted or removed from the upper edge of the supporting pipe and positioned.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described hereinbelow with reference to the drawings.

Figure 2:
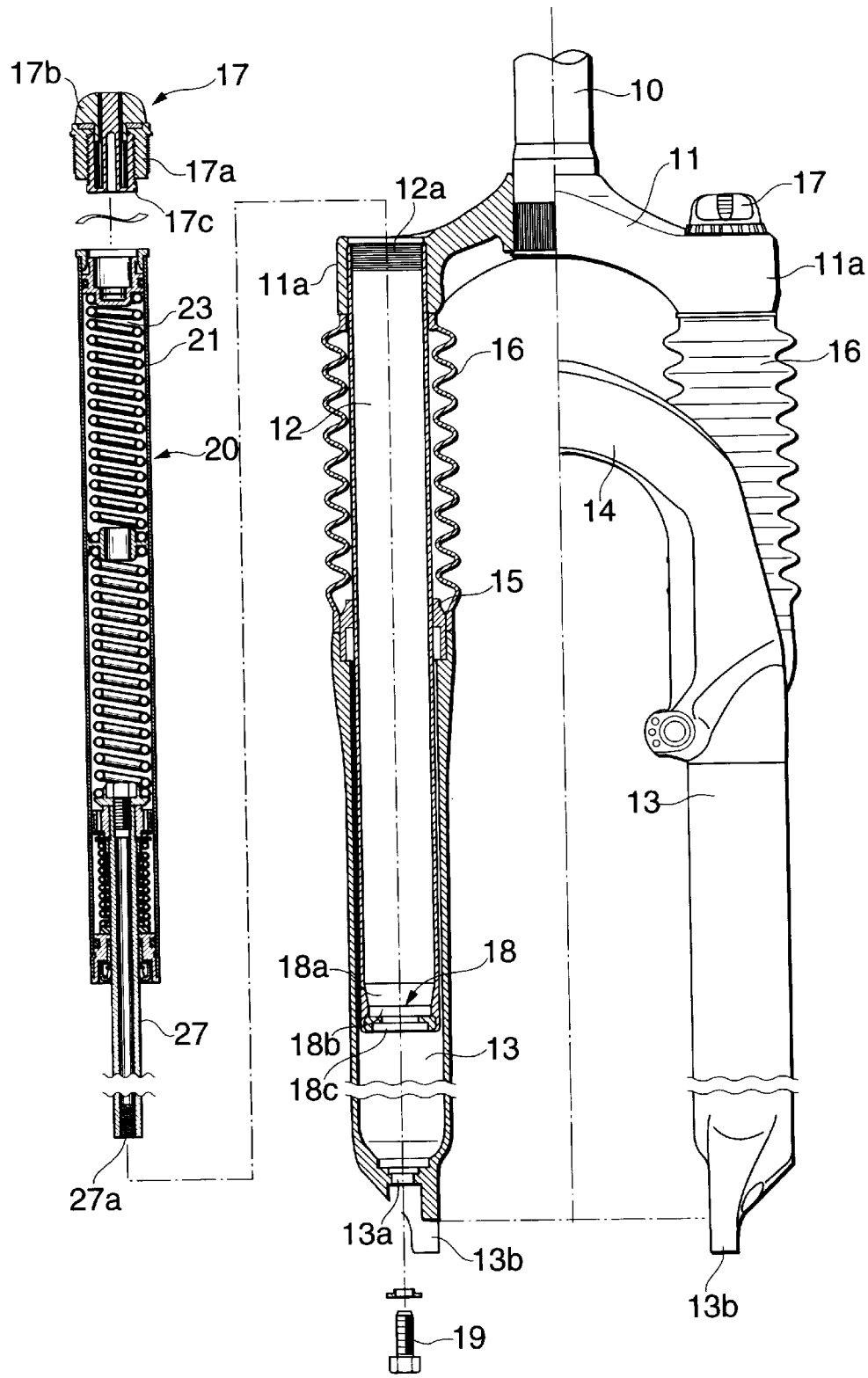
FIG. 2 is an exploded front view of a wheel suspension type front fork according to the invention with a part cut away.

FIG. 2 shows an example in the case where a wheel suspension type front fork according to the invention is applied to a front wheel of a bicycle and is a front view with a main part cut away.

In FIG. 2, reference numeral 10 denotes a steering pipe. Handle bars are attached to an upper edge of the pipe 10 through an extension system (not shown). A lower edge of the steering pipe 10 is inserted and fixed to the center of an upper crown 11 with a pressure. Upper portions of a pair of supporting pipes 12 are fitted and fixed into both arm portions 11a and 11a of the upper crown 11. An upper portion of a slide pipe 13 is slidably fitted to a lower portion of each of the supporting pipes 12. The slide pipes 13 and 13 are mutually coupled by a cross member 14. A dust sealing material 15 made of an elastic member which is come into slide contact with a peripheral surface of the supporting pipe 12 is attached to the upper portion of the slide pipe 13. A lower edge of bellows 16 for dustproof is coupled with an upper edge of the slide pipe 13. An upper edge of the bellows 16 is coupled with the arm portion 11a of the upper crown 11.

A screw groove 12a is formed on an inner peripheral surface of the upper portion of the supporting pipe 12. A cap 17 is screwed into the screw groove 12a. The cap 17 has: a main body 17a which is screwed into the screw groove 12a; a rotary portion 17b which is rotatably attached to an upper surface of the main body 17a; and a vertically movable pressing portion 17c which is spline coupled with a cylindrical portion of the rotary portion 17b. An outer peripheral screw portion of the pressing portion is screwed to an inner peripheral screw portion of the main body 17a. When the rotary portion 17b is rotated, therefore, the pressing portion 17c is moved upward and downward for the main body 17a while rotating.

Figure 1:
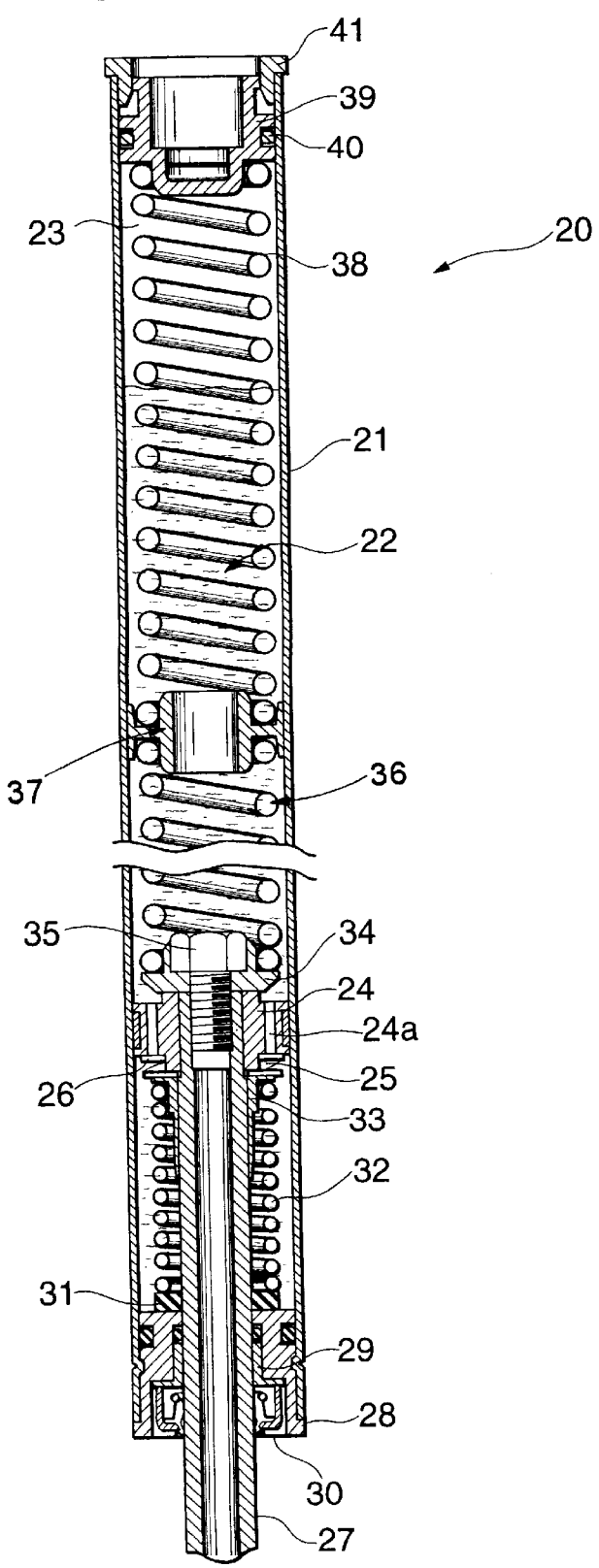
FIG. 1 is a cross sectional view of a hydraulic suspension unit according to the invention.

A hydraulic suspension unit 20 is arranged in the supporting pipe 12. FIG. 1 is an enlarged cross sectional view of the hydraulic suspension unit 20. The unit 20 has a cylindrical cylinder 21. The cylinder 21 has a length dimension such that it can be enclosed in the supporting pipe 12 and is exchangeably inserted and removed to/from the supporting pipe 12 from the upper position.

Oil 22 is filled in the cylinder 21 and an air spring 23 comprising an air chamber is formed in the upper portion. A piston 24 is vertically movably arranged in the lower portion of the cylinder 21. An oil passage 24a which penetrates in the thickness direction is formed in the piston 24. The passage 24a is closed by a valve plate 26 pressed to the lower surface of the piston 24 through a wave washer 25.

An upper edge of a piston rod 27 is inserted and fixed to a center hole portion of the piston 24. The piston rod 27 is extended downward and is projected from the lower position of the cylinder 21. The lower portion of the cylinder 21 holds a fluid-tight state and is closed by a cylindrical closing member 28 through an O ring. The piston rod 27 is projected from the cylinder 21 while keeping the fluid-tight state through a bush 29 inserted into a center hole of the closing member 28, the O ring, and an oil sealing portion 30.

A rubber bearer 31 is arranged on the upper surface of the closing member 28. A lower edge of a rebound coil spring 32 attached to the piston rod 27 is come into contact with the rubber bearer 31. An upper portion of the spring 32 presses a spring receiving portion 33 onto the lower surface of the piston.

A spring pedestal 34 is fixed to the upper surface of the piston with a bolt 35. The bolt 35 is screwed to an upper edge of the piston rod 27. A lower edge of a coil spring 36 for buffering is come into contact with and inserted to the spring pedestal 34. An upper edge of the coil spring 36 is come into contact with and inserted to a lower portion of a spring guide member 37 locating at almost the center of the cylinder 21. A lower edge of another coil spring 38 for buffering is come into contact with and inserted to an upper surface of the guide member 37.

The upper opening of the cylinder 21 is closed by a movable closing member 39. The movable closing member 39 is vertically movable in the cylinder 21 through an O ring 40 while keeping a fluid-tight state. An upper edge of the other coil spring 36 is come into contact with and inserted to the lower surface of the closing member 39. A top washer 41 is fitted and fixed to the upper edge of the cylinder 21. The top washer 41 is fitted to the inner peripheral surface of the supporting pipe 12 and coaxially holds the cylinder 21 in the supporting pipe 12.

Returning to FIG. 2, a diameter of the lower edge of the supporting pipe 12 gradually decreases and it supports a guide member 18. The guide member 18 has: a tapered portion 18a for guiding the lower portion of the cylinder 21; a fitting portion 18b for positioning and fixing the lower portion of the cylinder 21 which is guided by the tapered portion 18a to the center position of the supporting pipe; and a hole portion 18c adapted to allow the piston rod 27 to penetrate.

Figure 3:
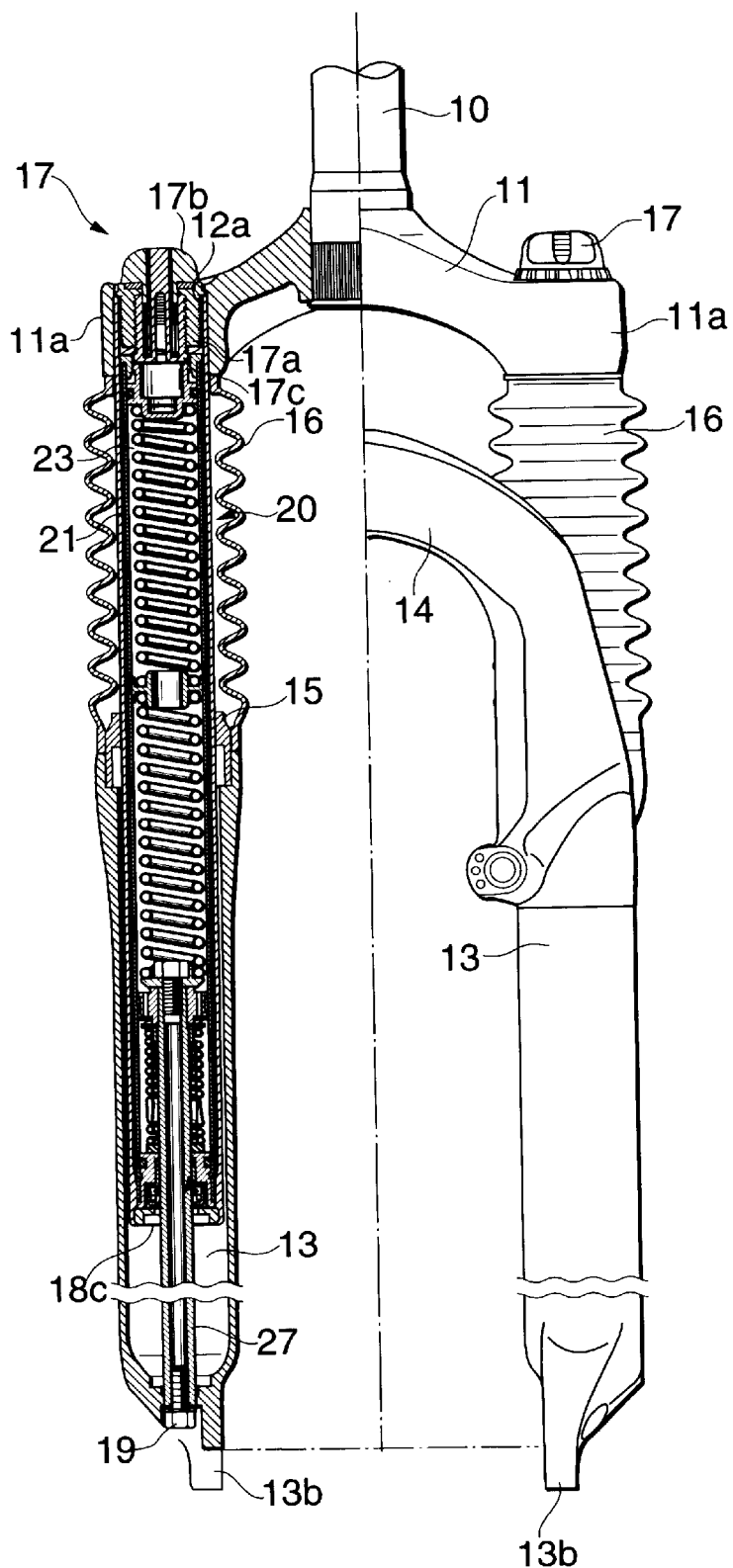
FIG. 3 is a cross sectional view of the front fork in which the hydraulic suspension unit of the invention is enclosed.

When the hydraulic suspension unit 20 having the above structure is inserted from the upper edge opening of the supporting pipe 12 as shown in FIG. 3, the lower edge of the cylinder 21 is automatically guided and held to the center position of the supporting pipe 12 by the guide member 18.

In this state, the piston rod 27 passes through the lower edge opening of the supporting pipe 12 and extends to a lower edge opening 13a of the slide pipe 13. The lower edge portion of the rod 27 is accurately inserted into the opening 13a. Therefore, after that, by positioning a fixing bolt 19 to the lower edge opening 13a of the slide pipe 13 and screwed into a screw hole 27a formed in the lower edge portion of the rod 27, the piston rod 27 and the lower edge of the slide pipe 13 can be detachably coupled.

An attaching portion 13b for attaching the bearing of the front wheel is projectingly formed at the lower edge of the slide pipe 13.

After the hydraulic suspension unit 20 is positioned and arranged in the supporting pipe 12, the main body 17a of the cap 17 is screwed to the screw groove 12a of the upper edge of the supporting pipe 12. When the main body 17a is screwed as mentioned above, since the main body 17a is pressed to the upper portion of the cylinder 21 through the top washer 41 and wave washer, the cylinder 21 is vertically unmovably supported in the supporting pipe 12. The pressing portion 17c is moved downward by rotating the rotary portion 17b. Thus, the movable closing member 39 of the unit 20 is pressed by the pressing portion 17c and moved downward in the cylinder 21 and presses the other coil spring 38. Therefore, shock forces of the buffering coil springs 36 and 38 can be adjusted.

In the case where the hydraulic suspension unit 20 is arranged in the supporting pipe 12 as mentioned above, if a shock force is applied to the slide pipe 13 from the front wheel (not shown), a pressing force is applied to the piston rod 27 together with the upward motion of the slide pipe 13, so that the piston 24 is moved upward in the cylinder 21 while allowing the oil 22 to flow. When the piston 24 is moved upward, the buffering coil springs 36 and 38 are contracted while absorbing (buffering) the shock force which is applied from the piston 24 and the cylinder 21 is held at the fixed position, so that the air spring 23 is also contracted and absorbs the shock force through the oil 22. Therefore, since the shock force can be gradually absorbed, the slide pipe 13 can be smoothly slided.

To exchange the hydraulic suspension unit 20, the fixing bolt 19 is removed from the screw hole 27a of the piston rod 27 and the cap 17 is removed from the supporting pipe 12. Since the buffering coil springs 36 and 38 and rebound coil spring 32 are assembled in the unit 20, it is sufficient to take out the unit 20 as it is from the upper edge opening of the supporting pipe 12. The unit 20, therefore, can be easily and efficiently exchanged.

Figure 4:
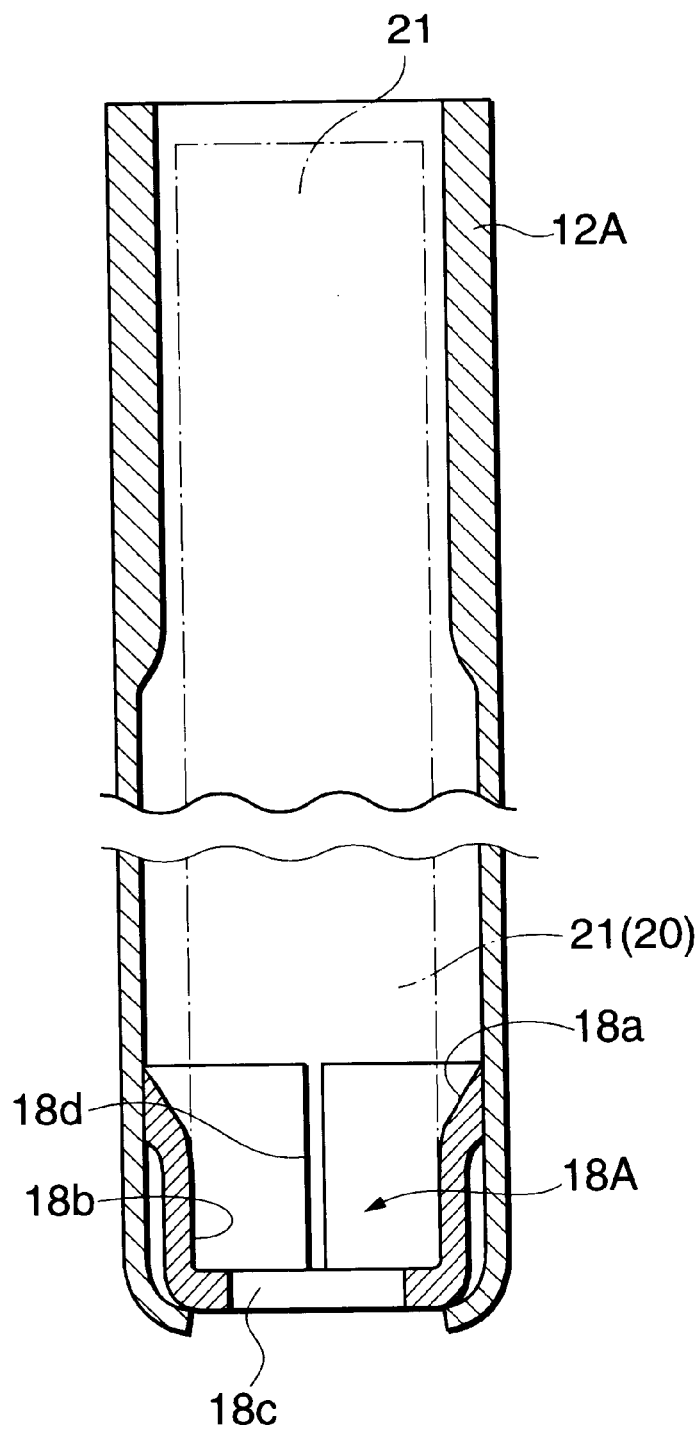
FIG. 4 is a cross sectional view according to another embodiment of the invention.

FIG. 4 is a cross sectional view showing another embodiment of the invention. In the embodiment, to realize a light weight, only an upper portion of a supporting pipe 12A is thickly formed and the other portions are thinly formed, namely, what is called a butted tube working is performed. According to the supporting pipe 12, since the outer diameter of the cylinder 21 is set to be small in correspondence to the inner diameter of the thick portion of the pipe 12A, a large gap occurs between the lower portion of the cylinder 21 and the lower portion of the supporting pipe 12A, thereby making it difficult to position the cylinder 21.

According to the embodiment, therefore, a guide member 18A which is contractible in diameter is used as shown in FIG. 4. The guide member 18A comprises the tapered portion 18a for guiding the lower portion of the cylinder 21, fitting portion 18b for positioning and fixing the lower portion of the cylinder 21 to the center position, and hole portion 18c for allowing the piston rod to penetrate. Notches 18d are formed on the tapered portion 18a and fitting portion 18b so as to communicate them.

When the guide member 18A is pushed to the thick portion (upper portion) of the supporting pipe 12A, it is contracted in diameter through the notches 18d. It is expanded in diameter at a lower edge position, matched with the center of the pipe 12A, and supported. The lower portion of the cylinder 21, therefore, can be accurately positioned and held.

Figure 5A:
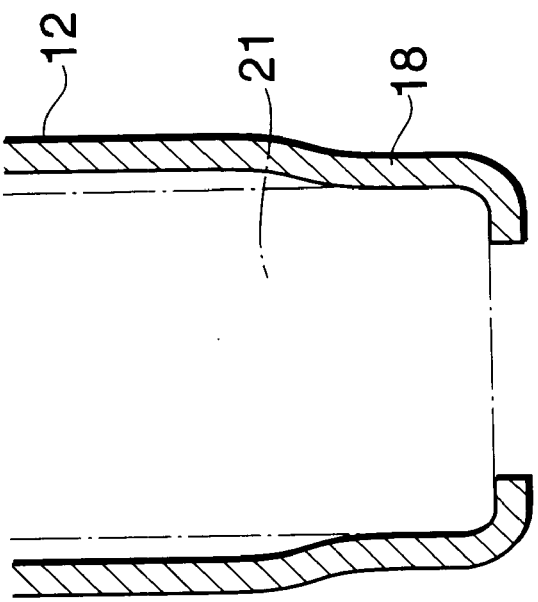
FIGS. 5A and 5B are cross sectional views according to modifications of the invention, respectively.
Figure 5B:
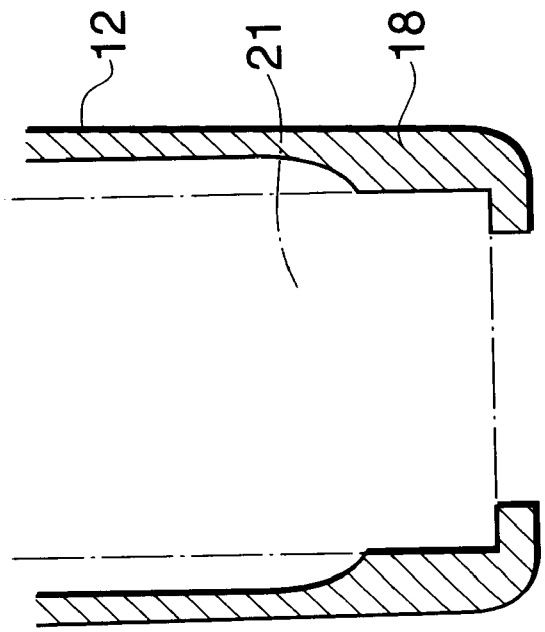

FIGS. 5A and 5B show modifications of the guide member. That is, in the example of FIG. 5A, the guide member 18 which is contracted in diameter in a tapered shape and whose edge portion is bent inwardly is integratedly formed in the lower portion of the supporting pipe 12.

In the example of FIG. 5B, the guide member 18 which is expanded inwardly in a tapered shape and whose edge portion is bent is integratedly formed in the lower portion of the supporting pipe 12.

The present invention is not limited to the foregoing embodiments but many modifications and variations are possible within the scope of the appended claims of the invention.

What is claimed is:

1. A wheel suspension front fork comprising:
   a supporting pipe attached at an upper end to a steering pipe;
   a slide pipe which is slidably fitted to said supporting pipe, said slide pipe having an attaching portion for attaching a wheel bearing at a lower portion thereof;
   a cap for detachably closing an opening at said upper end of said supporting pipe and an exchangeable hydraulic suspension unit which is arranged in said supporting pipe,
   wherein said hydraulic suspension unit comprises:
      a cylinder in which oil and air are sealed, said cylinder being exchangeably arranged in said supporting pipe through said opening and in which oil is filled;
      a piston which is movably arranged in said cylinder and has an oil passage;
      a piston rod in which one end is attached to said piston and the other end is projected from said cylinder and detachably coupled with said slide pipe;
      spring means arranged upon said piston and which has the function for buffering a shock force which is transferred from said slide pipe through said piston; and
      a movable closing member for sealing said cylinder and causing said spring means to expand or contract, and which is movably arranged upon said spring means and contacts said cap, wherein said cap comprises a linearly movable pressing portion to move said movable closing member.

2. A fork according to claim 1, further comprising:
   a movable closing member which closes an opening at an upper end of said cylinder and can adjust a projection amount into said cylinder so as to set the shock absorbing force of said buffer means.

3. A fork according to claim 1, wherein a guide portion for positioning and holding said cylinder is provided in said supporting pipe.

4. A wheel suspension type front fork comprising:
   a supporting pipe attached at an upper end to one of a steering pipe or extension member attached to said steering pipe;
   a slide pipe slidably fitted over at least a portion of said supporting pipe, said slide pipe having an attaching portion for attaching a wheel bearing at a lower portion thereof;
   a movable or removable cap for selectively providing access to an opening at said upper end of said supporting pipe, said opening having interior dimensions greater than corresponding dimensions of a hydraulic suspension unit adapted to be removably inserted into said supporting pipe through said opening,
   wherein said movable or removable cap comprises a threaded portion on an exterior thereof configured to matingly engage a corresponding threaded portion on an interior of said upper end of said supporting pipe;
   a threaded portion on an interior portion thereof configured to matingly engage a linearly movable pressing portion, and wherein rotation of the linear movable pressing portion causes movement of the linear movable pressing portion in a direction substantially perpendicular to the direction of rotation; and
   wherein the linearly movable pressing portion is spline coupled to a rotary member rotatably attached to an outer surface of said cap;
   wherein said hydraulic suspension unit comprises:
      a cylinder, said cylinder dimensioned to be insertable into said supporting pipe through said opening at said upper end of said supporting pipe, said cylinder comprising an upper portion and a lower portion in fluid communication with one another, said lower portion comprising a liquid-filled portion and said upper portion comprising a liquid-filled portion and a gas-filled chamber;
      a piston movably arranged in said cylinder, said piston including at least one passage from a front side to a back side thereof;
      a piston rod in which one end is attached to said piston and the other end is projected from an opening in a bottom portion of said cylinder, said other end of said piston rod configured to be detachably coupled with said slide pipe; and
      a buffer arranged in said cylinder to buffer a shock force which is transferred from said slide pipe through said piston, wherein said buffer comprises a first coil spring disposed in said cylinder upper portion and a second coil spring disposed in said cylinder lower portion.

5. A fork according to claim 4, wherein said upper portion of said cylinder is sealed by a movable closing member.

6. A fork according to claim 5, wherein a lower portion of said linearly movable pressing portion is configured to engage an upper portion of said movable closing member.

7. A fork according to claim 6, wherein a lower portion of said movable closing member engages an upper end of said first coil spring.

8. A fork according to claim 7, wherein a guide portion for positioning and holding said cylinder is provided in said supporting pipe.

9. A fork according to claim 8, wherein said guide portion comprises a tapered portion provided at least one of said upper end of said supporting pipe, a middle of said supporting pipe, or a lower end of said supporting pipe.

10. A wheel suspension front fork comprising:
- a supporting pipe attached at an upper end to one of a steering pipe or extension member attached to said steering pipe;
- a slide pipe slidably fitted over at least a portion of said supporting pipe, said slide pipe having an attaching portion for attaching a wheel bearing at a lower portion thereof;
- a movable or removable cap for selectively providing access to an opening at said upper end of said supporting pipe, said opening having interior dimensions greater than corresponding dimensions of a hydraulic suspension unit adapted to be removably inserted into said supporting pipe through said opening, wherein said hydraulic suspension unit comprises:
- a cylinder, said cylinder dimensioned to be insertable into said supporting pipe through said opening at said upper end of said supporting pipe, said cylinder comprising an upper portion and a lower portion in fluid communication with one another, said lower portion comprising a liquid-filled portion and said upper portion comprising a liquid-filled portion and a gas-filled chamber;
- a piston movably arranged in said cylinder, said piston including at least one passage from a front side to a back side thereof;
- a piston rod in which one end is attached to said piston and the other end is projected from an opening in a bottom portion of said cylinder, said other end of said piston rod configured to be detachably coupled with said slide pipe;
- a buffer arranged in said cylinder to buffer a shock force which is transferred from said slide pipe through said piston;
- wherein said buffer comprises a first coil spring disposed in said cylinder upper portion and a second coil spring disposed in said cylinder lower portion;
- wherein said movable or removable cap comprises a threaded portion on an exterior thereof configured to matingly engage a corresponding threaded portion on an interior of said upper end of said supporting pipe;
- wherein said movable or removable cap further comprises a treaded portion on an interior portion thereof configured to matingly engage a linearly movable pressing portion, and wherein rotation of the linear movable pressing portion causes movement of the linear movable pressing portion in a direction substantially perpendicular to the direction of rotation;
- wherein linearly movable pressing portion is spline coupled to a rotary member rotatably attached to an outer surface of said cap;
- wherein said upper portion of said cylinder is sealed by a movable closing member;
- wherein a lower portion of said linearly movable pressing portion is configured to engage an upper portion of said movable closing member;
- wherein a lower portion of said movable closing member engages an upper end of said first coil spring;
- wherein a guide portion for positioning and holding said cylinder is provided in said supporting pipe;

wherein said guide portion comprises a tapered portion provided at least one of said upper end of said supporting pipe, a middle of said supporting pipe, or a lower end of said supporting pipe; and
wherein said guide portion comprises notches.

11. A fork according to claim 4, wherein said fluid is oil.

12. A wheel suspension type front fork comprising:
- a supporting pipe attached at an upper end to one of a steering pipe or extension member attached to said steering pipe;
- a slide pipe slidably fitted over at least a portion of said supporting pipe, said slide pipe having an attaching portion for attaching a wheel bearing at a lower portion thereof;
- a movable or removable cap for selectively providing access to an opening at said upper end of said supporting pipe, said opening having interior dimensions greater than corresponding dimensions of a hydraulic suspension unit adapted to be removably inserted into said supporting pipe through said opening, wherein said hydraulic suspension unit comprises:
- a cylinder, said cylinder dimensioned to be insertable into said supporting pipe through said opening at said upper end of said supporting pipe, said cylinder comprising an upper portion and a lower portion in fluid communication with one another, said lower portion comprising a liquid-filled portion and said upper portion comprising a liquid-filled portion and a gas-filled chamber;
- a piston movably arranged in said cylinder, said piston including at least one passage from a front side to a back side thereof;
- a piston rod in which one end is attached to said piston and the other end is projected from an opening in a bottom portion of said cylinder, said other end of said piston rod configured to be detachably coupled with said slide pipe;
- a spring guide member disposed in the cylinder between said cylinder upper portion and said cylinder lower portion, said spring guide member including a first spring receiving surface on a top side thereof and a second spring receiving surface on a bottom side thereof; and
- a buffer arranged in said cylinder to buffering a shock force transferred from said slide pipe through said piston, said buffer comprising a first coil spring disposed in said cylinder to substantially traverse a distance from a bottom of said movable or removable cap to said first spring receiving surface and comprising a second coil spring disposed in said cylinder lower portion to substantially traverse a distance from a spring pedestal fixed to an upper surface of the piston to said second spring receiving surface; and
- a movable closing member for sealing said cylinder and causing said spring means to expand or contract, and which is movably arranged upon said spring means and contacts said cap, wherein said cap comprises a linearly movable pressing portion to move said movable closing member.

13. A fork according to claim 12, wherein said spring guide member is disposed at an approximate center of said cylinder along a length thereof.

\* \* \* \* \*